(12) United States Patent
Anson et al.

(10) Patent No.: US 7,308,102 B2
(45) Date of Patent: Dec. 11, 2007

(54) SYSTEM AND METHOD FOR SECURING ACCESS TO MEMORY MODULES

(75) Inventors: Douglas M. Anson, Dripping Springs, TX (US); Yuan-Chang Lo, Austin, TX (US); Frank H. Molsberry, Georgetown, TX (US); Clint H. O'Connor, Austin, TX (US); William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 677 days.

(21) Appl. No.: 10/634,942

(22) Filed: Aug. 5, 2003

(65) Prior Publication Data

US 2005/0033970 A1    Feb. 10, 2005

(51) Int. Cl.
*H04L 9/32* (2006.01)
*H04L 9/14* (2006.01)
*H04L 9/16* (2006.01)

(52) U.S. Cl. .......................... 380/264; 713/2; 713/171

(58) Field of Classification Search .................. 713/2, 713/171; 380/264
See application file for complete search history.

(56) References Cited

U.S. PATENT DOCUMENTS

| | | | |
|---|---|---|---|
| 6,199,167 B1 | 3/2001 | Heinrich et al. | 713/202 |
| 6,317,798 B1 | 11/2001 | Graf | 710/15 |
| 6,460,139 B1 | 10/2002 | Heinrich et al. | 713/200 |
| 6,480,097 B1 | 11/2002 | Zinsky et al. | 340/5.8 |
| 6,539,480 B1 | 3/2003 | Drews | 713/191 |
| 2002/0099950 A1* | 7/2002 | Smith | 713/200 |
| 2002/0166067 A1 | 11/2002 | Pritchard et al. | 713/201 |
| 2002/0174351 A1* | 11/2002 | Jeong et al. | 713/189 |
| 2003/0041248 A1 | 2/2003 | Weber et al. | 713/182 |

OTHER PUBLICATIONS

Microsoft, "Microsoft "Palladium": A Business Overview," at <http://www.microsoft.com/presspass/features/2002/jul02/0724palladiumwp.asp> 12 pages, Printed May 19, 2003.
Trusted Computing Platform Alliance (TCPA), "Building A Foundation of Trust in the PC" at <http://www.trustedcomputing.org/docs/TCPA_first_WP.pdf> 9 pages, Jan. 2000.
Phoenix Technologies, "Grid Edition v.3.5—ServerBIOS" at <www.phoenix.com/resources/serverbios_grid_data_sheet.pdf> 2 pages, no date.
Trusted Computing Platform Alliance (TCPA), "Main Specification Version 1.1b" 332 pages, May 2002.

* cited by examiner

*Primary Examiner*—Gilberto Barron
*Assistant Examiner*—Venkat Perungavoor
(74) *Attorney, Agent, or Firm*—Baker Botts L.L.P.

(57) ABSTRACT

A system and method for securing access to memory modules includes a memory module, a virtual memory module, a boot module, and a gatekeeper. The boot module accepts a key and requests for the memory module and provides the requests and the key to the virtual memory module. The virtual memory module is externally accessible by the boot module and accepts the provided key and the requests from the boot module and transmits the requests and the provided key from the boot module to the gatekeeper. The gatekeeper regulates access to the memory module allowing no other components to directly access the memory module. The gatekeeper receives the provided key from the virtual memory module and the gatekeeper authenticates the provided key by comparing it with a stored key stored in secure location. Upon proper authentication of the provided key, the gatekeeper executes the request in the memory module.

20 Claims, 2 Drawing Sheets

SYSTEM AND METHOD FOR SECURING ACCESS TO MEMORY MODULES

TECHNICAL FIELD

This disclosure relates in general to the field of information handling systems, and more particularly to a system and method for securing memory modules.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When an information handling system is first powered on, the POST (power-on self-test) process begins whereby the boot process and the BIOS perform a series of system checks. For instance, the BIOS upon start-up of the information handling system determines if certain devices and components are connected and functioning properly. Once the POST and BIOS complete the system checks, the results of the system checks are compared against the data in the CMOS (complementary metal-oxide semiconductor) memory chip or memory module. The CMOS memory module is the official record of the installed components within the information handling system. Powered by a small battery and consuming extremely little power, the CMOS memory module retains crucial information about the hardware comprising the information handling system even when the power to the information handling system is turned off.

Any changes to the basic system configuration of the information handling system must be recorded in the CMOS setup. For instance, if the system tests detect new hardware, such as a new monitor, a printer, or a disk drive, the user of the information handling system is given the chance to update the setup configuration. For example, if the user installs a new hard drive in the information handling system, when running the POST the BIOS detects the new hard drive. When comparing the tested configuration with the stored configuration in the CMOS, the BIOS detects that the new hard drive is not stored in the configuration stored in the CMOS and therefore is alerted to the fact that the hard drive is a new component and requires proper installation. Once properly installed, the configuration in the CMOS is updated to include the new hard drive. In addition to system configurations, the CMOS also stores such system information as the clock/calendar time, types of disks, and the amount of memory.

In current information handling systems, the BIOS serves as a guardian for the CMOS. Before being able to make a change to the CMOS, an administrator password must be supplied to the BIOS whether the password be supplied directly by the user or by a remote management system. The administrator password is stored inside the CMOS. The BIOS checks the password provided by the user with the administrator password stored in the CMOS before writing to the CMOS. If the two passwords match, the BIOS allows the user to write to or read from the CMOS. If the two passwords do not match, the BIOS does not execute the write or read requests in the CMOS.

The BIOS acting as the guardian does not provide complete security for the CMOS. The CMOS may be directly accessed and therefore a user may bypass the BIOS and directly access the CMOS. An unauthorized user desiring to obtain information from the information handling system can directly access the CMOS and manipulate the bits within the CMOS to locate the administrator password. Because the CMOS is directly accessible, the bits within the CMOS are unguarded and therefore unprotected by the BIOS. After accessing the CMOS, a user may obtain the administrator password and make changes to the CMOS by supplying the correct administrator password to the BIOS. Furthermore, with direct access to the CMOS, the user can make any changes to the CMOS without having to go through the BIOS or supply the administrator password. Hence software authentication or protection of the CMOS with the administrator password does not serve to completely protect or secure the CMOS and is easily defeatable because the CMOS and the administrator password are directly accessible to users without having to access the BIOS.

SUMMARY

Therefore, a need has arisen for a system and method that allows for a secure memory module architecture where the memory module is not directly accessible.

In accordance with the teachings of the present disclosure, a system and method are described which substantially eliminate or reduce disadvantages with previous systems and methods for securing memory modules. A secured memory module including a memory module, a virtual memory module, and a gatekeeper allows for a memory module that is accessible via the virtual memory module and therefore not directly accessible where access of the memory module requires the authentication of a key by the gatekeeper.

In accordance with one aspect of the present disclosure, an information handling system is provided. The information handling system includes a chassis, a motherboard disposed within the chassis, at least one processor operably coupled to the motherboard, a memory module, a virtual memory module, a boot module, and a gatekeeper. The boot module accepts a key and one or more requests for the memory module and provides the requests and the key to the virtual memory module. The virtual memory module is externally accessible by the boot module and accepts the key and the one or more requests from the boot module. The virtual memory module transmits the one or more requests and the key from the boot module to the gatekeeper. The gatekeeper regulates access to the memory module. When the gatekeeper receives the key from the virtual memory module, the gatekeeper authenticates the key and does not allow modification of the memory module if the key is not authenticated.

More specifically in one embodiment, a stored key is stored in a programmatically inaccessible location within either the gatekeeper or the memory module. When the gatekeeper receives the request and key from the boot module via the virtual memory module, the gatekeeper retrieves the stored key from the programmatically inaccessible location and compares the key provided by the boot module with the stored key. If the key provided by the boot module and the stored key are the same, then the key is authenticated and the request is processed within the memory module.

The present disclosure provides a number of important technical advantages. One important technical advantage is the inaccessibility of the memory module. With the addition of the gatekeeper, the boot module no longer operates as the guardian for the memory module and the boot module no longer writes directly to the memory module. Instead, the boot module writes to the virtual memory module believing that the virtual memory module is the memory module. Read and write requests are only executed in the memory module by the gatekeeper if the key provided when accessing the boot module matches the key stored in the programmatically inaccessible location. Therefore, the memory module is not directly accessible by the boot module and therefore not accessible to any outside users and is difficult to hack for unauthorized changes. In addition, since the key is stored in a programmatically inaccessible location within either the gatekeeper or the memory module, neither of which are directly accessible, the key is not accessible to any outside users and cannot be easily retrieved by an unauthorized user in order to make unauthorized changes to the memory module.

Another important technical advantage is that the secured memory module architecture functions with existing information handling system components. The memory module, gatekeeper, and virtual memory module are designed so as not to require any changes to the other components of the information handling system. The virtual memory module is designed so that it appears to the boot module as the memory module and the boot module does not have to be redesigned in order to communicate requests to the virtual memory module instead of the memory module. Therefore, when the boot module accesses the virtual memory module, the boot module believes that it is interacting with the actual memory module and not the virtual memory module.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to the figures, wherein like numbers are used to indicate like and corresponding parts.

Previous systems and methods for securing access to memory modules have been designed without taking into account the accessibility of the memory module to unauthorized users and the enhanced security issues relating to information handling systems. Furthermore, previous systems and methods have focused on securing the BIOS and have not addressed the vulnerability of the CMOS memory module thereby leaving the CMOS open to attack by an unauthorized user or computer hacker. For instance, previous systems and methods have employed software protection to safeguard the BIOS from unauthorized users. But the BIOS protection can be circumvented to allow for direct access to the CMOS. Therefore, the CMOS is vulnerable to unauthorized access. The present disclosure allows for a system and method for securing memory modules such as the CMOS utilizing a hardware gatekeeper that directly monitors and controls access to the memory modules such as the CMOS.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
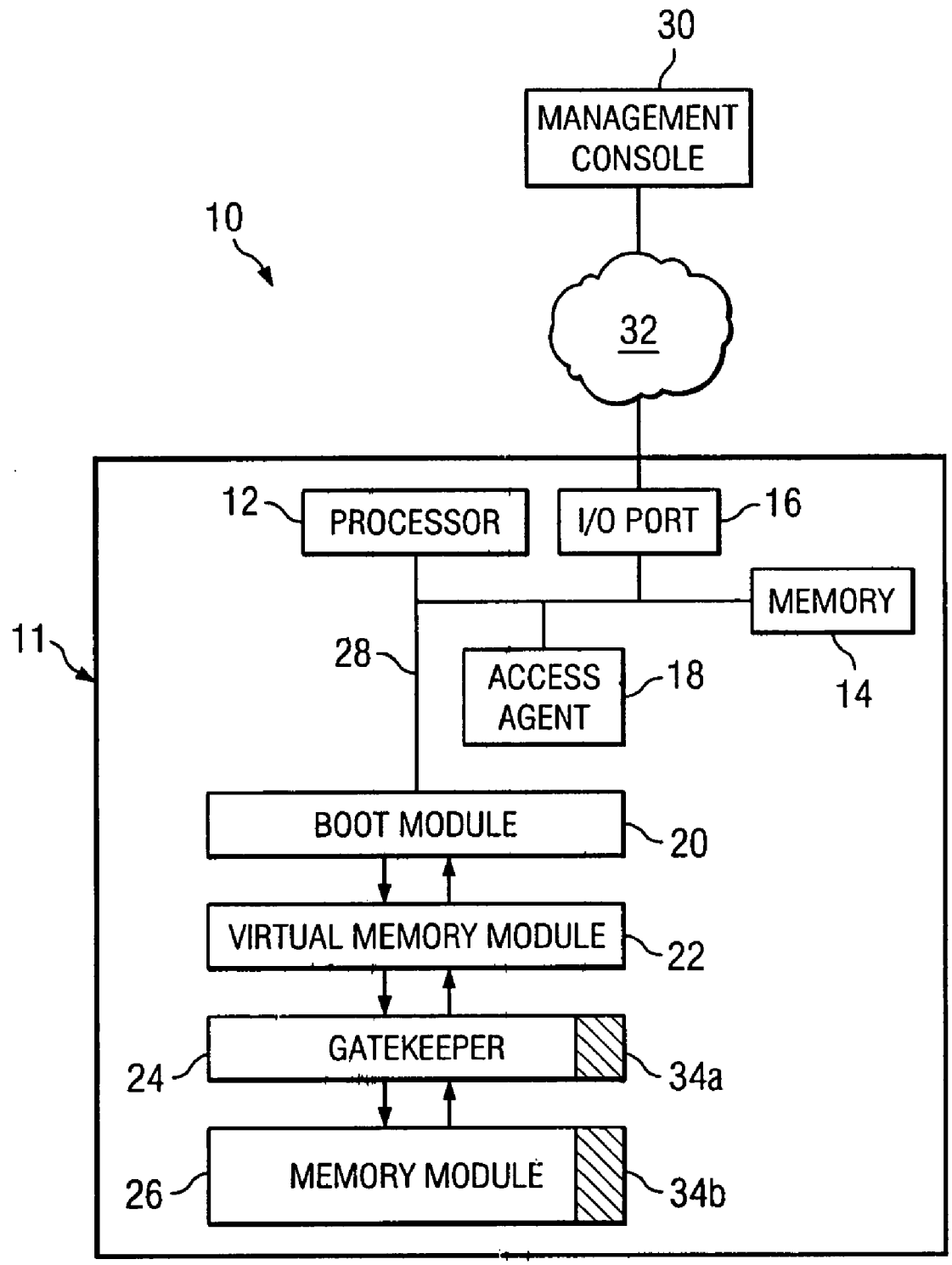
FIG. 1 illustrates a block diagram of an example information handling system.

FIG. 1 illustrates a block diagram of system 10 including information handling system 11. In the example embodiment, information handling system 11 includes respective software components and hardware components, such as processor 12, memory 14, input/output ports 16, access agent 18, boot module 20, virtual memory module 22, gatekeeper 24, and memory module 26, and those components may work together via bus 28 to provide the desired functionality. Bus 28 provides a communication link between the above components and is typically used as a control, diagnostic, or power management bus with interconnects and transfers of information between the various components of information handling system 11. The various hardware and software components may also be referred to as processing resources. Information handling system 11 may be a personal computer, a portable computer, a personal digital assistant (PDA), a server, or any other appropriate information handling device.

System 10 further includes management module 30 that interfaces and communicates with information handling system 11 and allows for remote operation of information handling system 11. In the embodiment shown in FIG. 1, management console 30 is remotely located from information handling system 11. For instance, management console 30 may be located separate from information handling system 11 such as in the same room, in a different room, in a different building, or in a different city, state, or country.

In other embodiments, management console 30 may be located within information handling system 11. Management console 30 interfaces and communicates with I/O port 16 and access agent 18 of information handling system 11 through network 32. Network 32 may be a LAN, a WAN, a public switched telephone network, the Internet, intranets, a cable network, a wireless network, or any other appropriate type of communication network.

Memory module 26 is a memory device including a plurality of bits storing various information regarding information handling system 11. The bits of memory module 26 store information such as the boot order and system configurations for information handling system 11. In the embodiment shown in FIG. 1, memory module 26 is a CMOS. In alternate embodiments memory module 26 is preferably a nonvolatile memory such as CMOS, as described in the present embodiment, or flash memory. In additional alternate embodiments, memory module 26 may comprise any appropriate type of memory module.

Gatekeeper 24 is a hardware device that regulates and controls access to memory module 26 thereby preventing direct access of memory module 26. Gatekeeper 24 is a hardware component such as a switch, a latch gate, a latch mechanism, or any other appropriate type of hardware device for controlling access. Because gatekeeper regulates access to memory module 26, only gatekeeper 24 can access and modify memory module 26. The other components of information handling system 11 and the users of information handling system 11 cannot directly access memory module 26 without accessing gatekeeper 24. Furthermore, gatekeeper 24 may include secure location 34a where a key may be stored. The key is preferably a symmetric key or password that is required by gatekeeper 24 for access to memory module 26. Secure location 34a is a programmatically inaccessible location within gatekeeper 24 that is accessible only to gatekeeper 24. In other embodiments, gatekeeper 24 may not include a secure location 34 but instead memory module 26 may include secure location 34b whereby the key is stored. Regardless of the location of secure location 34 (whether in gatekeeper 24 or memory module 26), secure location 34 may be an extra addressable line only addressable by gatekeeper 24.

Virtual memory module 22 is a hardware component that appears as the actual memory module to all of the components of information handling system 11 except gatekeeper 24 and memory module 26. Virtual memory module 22 is the same hardware as memory module 26 and includes the identical address space as memory module 26. In some embodiments, virtual memory module 22 and memory module 26 may coexist on the same hardware component, in alternate embodiments, virtual memory module 22 and memory module 26 may by provided on separate hardware components. Virtual memory module 22 is externally accessible to boot module 20, appears as memory module 26 to boot module 20, and operates as a suggestion area for receiving configuration change requests to memory module 26 from boot module 20.

Virtual memory module 22 may be either a volatile or non-volatile memory. Virtual memory module 22 may have a capacity equal to that of memory module 26. In an alternate embodiment, virtual memory module 22 may have a smaller capacity than memory module 26, so long as the address of virtual memory 22 being read is stored with the data for use of gatekeeper 24 and virtual memory 22 has sufficient capacity to accommodate the maximum anticipated serialization.

Boot module 20 is a control and booting device such as the BIOS. Boot module 20 of information handling system 11 is a typical boot module except that boot module 20 provides requests, such as read and write requests, to virtual memory module 22 instead of directly to memory module 26. Because virtual memory module 22 appears identical to memory module 26 to boot module 20, very few changes are necessary for boot module 20 to provide requests to virtual memory module 22.

Figure 2:
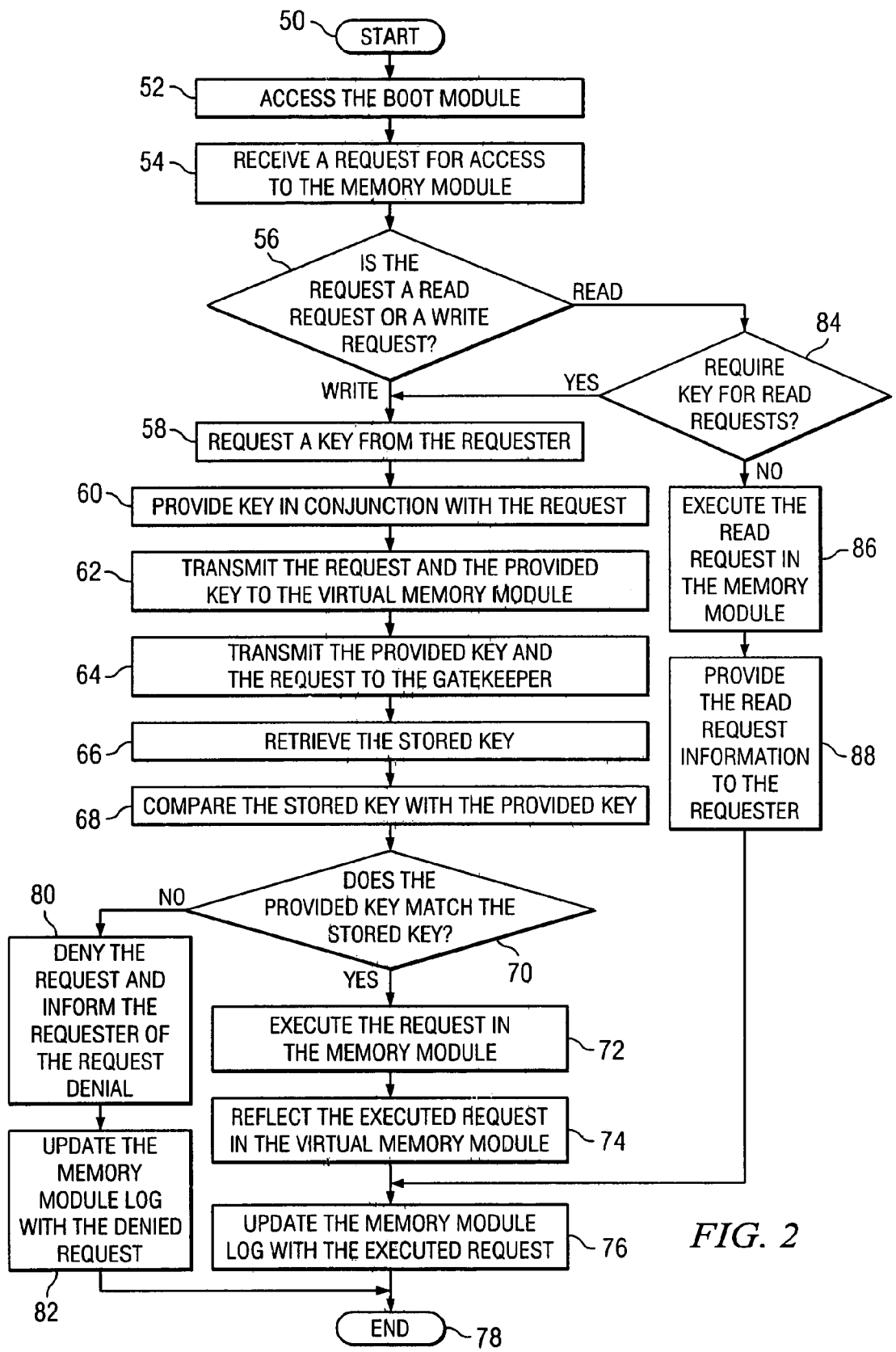
FIG. 2 illustrates a flow diagram of an example method for securing access to a memory module.

FIG. 2 illustrates a flow diagram of an example method for securing access to memory modules such as memory module 26. The method begins at step 50 and at step 52 a user or management console 30 (via access agent 18) access boot module 20 of information handling system 11. A user accesses information handling system 11 directly and to control information handling system 11 while management console 30 remotely accesses information handling system 11 to allow for remote control and operation of information handling system 11. The user may access boot module 20 in order to alter the boot order, add a new component to information handling system 11, or for any other appropriate reason for accessing boot module 20.

When the user accesses information handling system 11 and boot module 20, the user generally desires to provide a request to memory module 26. The request may be a write or set request where the user desires to alter the configuration of the bits within memory module 26 or the request may be a read request where the user desires to read but not alter the configuration of the bits within memory module 26. A user may provide a write request when installing a new component in information handling system 11 and may provide a read request when performing a diagnostic test of information handling system 11. The user provides a request and at step 54 boot module 20 receives the request from the user.

In previous systems and methods, when the boot module received a request from the user, the boot module would execute the request in the memory module often without verifying the validity of the request or the user. In the present disclosure, when boot module 20 receives the request at step 54, at step 56 boot module 20 determines if the received request is a request to write to memory module 26 or to read from memory module 26.

If the request is a write request, then at step 58 boot module 20 requests from the user the key. As previously described, the key is a symmetric password or secret code that is required by gatekeeper 24 in order to access memory module 26. The key functions as a security means for memory module 26. If the user is an authorized user of information handling system 11, then the user should have access to the key. The key can come pre-set from the manufacturer of information handling system 11 when the user purchases information handling system 11 or the user can initialize the key when the user receives information handling system 11. Regardless of whether the key comes pre-set in information handling system 11, the user has the ability to modify or change the key to a password that is easy for the user to remember. The user also can change the key in instances where the key becomes known by unauthorized persons. When boot module 20 request the key from the user, the user provides the key at step 60. In other embodiments, the user may initially provide the key at the same time as providing the request so that boot module 20 does not have to request the key from the user.

Once boot module 20 receives the request and the key from the user, at step 62 boot module 20 transfers the request and the key to virtual memory module 22. Because boot module 20 understands virtual memory module 22 to in fact be memory module 26, boot module 20 transmits the request to virtual memory module 22 in the same manner as boot module 20 would communicate the request to the actual memory module 26. Furthermore, boot module 20 may make any changes in virtual memory module 22 as required by the request but the changes made by boot module 20 in virtual memory module 22 will not be permanent in virtual memory module 22 nor reflected in memory module 26 until gatekeeper 24 authenticates the key provided by the user.

The transmission of the request and key from boot module 20 to virtual memory module 22 alerts gatekeeper 24 that boot module 20 is attempting to access memory module 26. At step 64, virtual memory module 22 transmits the request and the provided key to gatekeeper 24 and gatekeeper 24 receives the request and provided key.

In order to process the request within memory module 26, gatekeeper 24 must first authenticate the key provided by the user. To authenticate the provided key, gatekeeper 24 compares the provided key with a stored key stored in secure location 34. As stated above, the key is stored in secure location 34 which may be either within gatekeeper 34 (secure location 34a) or memory module 26 (secure location 34b). The location of secure location 34, whether in gatekeeper 24 or memory module 26, does not affect the retrieval of the stored key nor the comparison of the stored key with the provided key. At step 66, gatekeeper 24 retrieves the stored key from secure location 34 and at step 68 compares the stored key with the provided key to see if the two keys are identical. In other embodiments, hashes of the key may be utilized instead of the actual key. For instance, when gatekeeper 24 receives the provided key from virtual memory module 22, gatekeeper 24 may make a hash of the provided key. Once gatekeeper 24 has created a hash of the provided key, gatekeeper 24 may then retrieve a hash of the stored key from secure location 34 and compare the two hashes. Creating and retrieving hashes of the provided key and the stored key allows for a greater level of security in that the actual stored key is not actually being accessed by gatekeeper 24.

If the provided key matches the stored key at step 70, then the provided key and accordingly the user has been properly authenticated and gatekeeper 24 assumes that the user is an authorized user of information handling system 11. Therefore at step 72, gatekeeper 24 accesses memory module 26 and executes the request within memory module 26.

After gatekeeper 24 executes the request in memory module 26, at step 74 gatekeeper 24 makes permanent the changes in virtual memory module 22 earlier made by boot module 20 at step 62. Therefore, virtual memory module 22 is an accurate reflection of memory module 26. Once gatekeeper 24 alters virtual memory module 22 to reflect memory module 26, at step 76 gatekeeper updates the memory module log with the executed request and the method ends at step 78. The memory module log is an auditable log of all the attempted requests and executed requests made with respect to memory module 76. The memory module log allows the user to track and review every request that has been made upon memory module 26 whether the request has been executed or rejected. The memory module log is a useful tool for alerting the user to potential security breaches of information handling system 11 because the user can examine the memory module log in order to locate all the denied requests where the proper key was not provided by the user. Furthermore, the memory module log is useful for diagnosis to determine the source of an error with information handling system 11.

If at step 70 the provided key does not match the stored key, then at step 80 gatekeeper 24 denies the request and does not execute the request within memory module 26. In addition, gatekeeper 24 informs boot module 20 and the user of the denial of the request and does not make permanent the change in virtual memory module 22 previously made by boot module 20 at step 62. Since no changes are made in memory module 26, no changes are made in virtual memory module 22 thereby allowing virtual memory module 22 and memory module 26 to remain mirror images of each other. After denying the request, at step 82 gatekeeper 24 updates the memory module log with the denied request and the method ends at step 78.

If at step 56 the request is a read request, the method continues to step 84 where gatekeeper 24 determines if the key is required for a read of memory module 26. Because a read request is not altering the bits of memory module 26, the key might not be required by gatekeeper 24 in order to process the read request. The decision on whether to require the key for a read request can be determined by the manufacturer of information handling system 11, the user, or any other appropriate entity. A user may decide that because a read request is not changing the bits of memory module 26 that the key is not required for read request. Another user may decide that any access of memory module 26 requires the key regardless of whether bits of memory module 26 are being modified so the key will be required for a read request. Whether or not the key is provided for a read request depends on the level of security for information handling system 11 desired by the user. If the key is required for a read request at step 84, then the method continues to step 58 and the method proceeds through step 58 through step 82 as described above except with a read request instead of a write request.

With the key not required for a read request at step 84, at step 86 gatekeeper 24 receives the read request from boot module 20 and virtual memory module 22 and executes the read request in memory module 26. At step 88 gatekeeper 24 provides the information requested in the read request to the user via boot module 20 and virtual memory module 22. Because the key is not required for a read request, gatekeeper 24 does not have to authenticate the user. After providing the read request information to boot module 20, at step 76 gatekeeper 24 updates the memory module log with the executed read request and the method ends at step 78. In the instance where virtual memory module 22 is a volatile memory, such a read-request will populate virtual memory module 22 from memory module 26 and not require a copy of memory module 26 to be made on virtual memory module 22 upon power up.

If gatekeeper 24 receives one or more simultaneous requests, whether write, read, or a combination, from boot module 20 at the same time or receives one or more requests while currently processing a request, gatekeeper 24 serializes the requests in a first in, first out sequence. Therefore, the request received first is processed first, the request received second is processed second and so forth until all the requests have been processed by gatekeeper 24. If gatekeeper 24 receives one or more requests while currently processing a request, gatekeeper 24 completes processing the request currently being processed and then processes the requests in a first in, first out sequence. In other embodiments, an importance or urgency value may be associated with each request and therefore gatekeeper 24 processes the requests from most important or urgent to least important or urgent.

Although the discussion above regarding FIG. 2 is with respect to a user accessing information handling system 11, the method equally applies for when management console 30 remotely accesses information handling system 11. With respect to remote operation of information handling system 11 by management console 30, access agent 18 acts in place of the user where trust (as described below) is created between access agent 18 and management console 30 outside of information handling system 11 and between access agent 18 and memory module 26 within information handling system 11.

As with the user, access agent 18 has knowledge of the key and is able to safeguard, encrypt, and securely store the key. Management console 30 contacts access agent 18 via I/O port 16 with a request for memory module 26. Management console 30 has no knowledge of the key and therefore utilizes PKI (public key infrastructure) security measures to remotely access information handling system 11 and access agent 18. There are a series of public and private credentials between management console 30 and access agent 18 that tightly bind the PKI credentials with the key so that the key is protected and secure within access agent 18, thereby allowing management console 30 to not require knowledge of the key in order to remotely manage information handling system 11. Therefore, when access agent 18 receives a request from management console 30, access agent 18 verifies management console 30 using the PKI credentials and establishes an appropriate level of trust with management console 30. If access agent 18 properly authenticates management console 30, then access agent 18 provides the request to boot module 20 much like the user provides the request to boot module 20 and the operation of boot module 20, virtual memory module 22, gatekeeper 24, and memory module 26 as how described above. Furthermore, if the user or a remote manager changes the key, access agent 18 will need to be notified of the new key so access agent 18 will be able to continue providing requests to memory module 26 and providing the correct key so that the requests are executed in memory module 26.

Security of information handling system 11 and memory module 26 is enhanced because the key is required to effect changes to memory module 26 and the key is only known by a select few entities—the user, access agent 18, and gatekeeper 24. The key is securely stored in a secure location that is programmatically inaccessible in both gatekeeper 24 and access agent 18 so that it is difficult for an unauthorized user to learn or discover the key unless the unauthorized user obtains the key from the user.

For example, if an unauthorized user attempts to modify the boot sequence to allow booting from a floppy, the unauthorized user may be successful at writing the new boot sequence on virtual memory module 22. However, during a valid BIOS reading, the boot sequence is read from memory module 26 (and not from virtual memory module 22). After the BIOS information is read from memory module 26, the virtual memory 22 is updated (thereby removing the unauthorized boot sequence), and the discrepancy is noted in the memory module log (as described in step 82).

Although the securing process has been described with respect to CMOS memory modules in the figures, other embodiments may include securing any other appropriate type of memory module where securing direct access is desirable. Furthermore, the present disclosure may be utilized with respect to information handling systems such as personal computers, servers, portable computers, person digital assistants, or any other appropriate type of information handling systems.

Although the disclosed embodiments have been described in detail, it should be understood that various changes, substitutions and alterations can be made to the embodiments without departing from their spirit and scope.

What is claimed is:

1. An information handling system comprising:
   at least one processor;
   a memory module;
   a boot module, operable to accept a key and one or more requests for the memory module and provide the requests and the key to a virtual memory module;
   a management console located remotely from the boot module, the memory module, the virtual memory module, and a gatekeeper, the management console not having access to the key and operable to remotely manage the boot module and remotely transmit one or more requests to the boot module;
   an access agent associated with the boot module, the access agent securely storing the key and operable to transmit one or more requests from the management console to the boot module;
   the virtual memory module externally accessible by the boot module, the virtual memory module operable to accept the requests and the key from the boot module and transmit the requests and the key from the boot module to the gatekeeper; and
   the gatekeeper associated with the memory module, the gatekeeper operable to regulate access to the memory module, authenticate the key provided by the boot module, and prevent modification of the memory module without authentication of the key.

2. The information handling system of claim 1 further comprising the gatekeeper operable to execute the request for the memory module upon authentication of the key.

3. The information handling system of claim 1 further comprising the gatekeeper operable to reflect in the virtual memory module one or more changes made in the memory module.

4. The information handling system of claim 1 further comprising the gatekeeper operable to authenticate the key by comparing the key provided by the boot module to a stored key secured in a programmatically inaccessible location.

5. The information handling system of claim 4 further comprising the stored key secured in a programmatically inaccessible location within the memory module.

6. The information handling system of claim 4 further comprising the stored key secured in a programmatically inaccessible location within the gatekeeper.

7. The information handling system of claim 1 wherein the gatekeeper comprises a latch mechanism.

8. The information handling system of claim 1 further comprising the gatekeeper operable to serialize the requests from the boot module in a first in, first out sequence when the boot module transmits more than one request.

9. An information handling system comprising:
   at least one processor;
   a memory module;
   a boot module, operable to accept one or more requests for the memory module from a remotely located management console and a key and further operable to provide the requests and the key to a virtual memory module;
   wherein the information handling system is operable to prevent the management console from accessing the key and further operable to permit the management console to remotely manage the boot module and remotely transmit one or more requests to the boot module;

an access agent associated with the boot module, the access agent securely storing the key and operable to transmit one or more requests from the management console to the boot module;

the virtual memory module externally accessible by the boot module, the virtual memory module operable to accept the requests and the key from the boot module and transmit the requests and the key from the boot module to a gatekeeper; and the gatekeeper associated with the memory module, the gatekeeper operable to regulate access to the memory module, authenticate the key provided by the boot module, and prevent modification of the memory module without authentication of the key.

10. The information handling system of claim 9 further comprising the gatekeeper operable to execute the request for the memory module upon authentication of the key.

11. The information handling system of claim 9 further comprising the gatekeeper operable to reflect in the virtual memory module one or more changes made in the memory module.

12. The information handling system of claim 9 further comprising the gatekeeper operable to authenticate the key by comparing the key provided by the boot module to a stored key secured in a programmatically inaccessible location.

13. The information handling system of claim 12 further comprising the stored key secured in a programmatically inaccessible location within the memory module.

14. The information handling system of claim 12 further comprising the stored key secured in a programmatically inaccessible location within the gatekeeper.

15. The information handling system of claim 9 wherein the gatekeeper comprises a latch mechanism.

16. The information handling system of claim 9 further comprising the gatekeeper operable to serialize the requests from the boot module in a first in, first out sequence when the boot module transmits more than one request.

17. An information handling system comprising:

at least one processor;

a memory module;

a boot module, operable to accept one or more requests for the memory module from a remotely located management console and a key and provide the requests and the key to a virtual memory module;

an access agent associated with the boot module, the access agent securely storing the key such that the remotely located management console cannot access the key, and operable to transmit one or more remote requests from the remotely located management console to the boot module;

the virtual memory module externally accessible by the boot module, the virtual memory module operable to accept the requests and the key from the boot module and transmit the requests and the key from the boot module to a gatekeeper; and the gatekeeper associated with the memory module, the gatekeeper operable to regulate access to the memory module, authenticate the key provided by the boot module, and prevent modification of the memory module without authentication of the key.

18. The information handling system of claim 17 further comprising the gatekeeper operable to reflect in the virtual memory module one or more changes made in the memory module.

19. The information handling system of claim 17 wherein the gatekeeper comprises a latch mechanism.

20. The information handling system of claim 17 further comprising the gatekeeper operable to serialize the requests from the boot module in a first in, first out sequence when the boot module transmits more than one request.

* * * * *